United States Patent [19]

Lester

[11] Patent Number: 5,071,394
[45] Date of Patent: Dec. 10, 1991

[54] CONTINUOUSLY VARIABLE TRANSMISSION

[76] Inventor: William T. Lester, 513 Kimbrough St., Fort Worth, Tex. 76108

[21] Appl. No.: 614,299

[22] Filed: Nov. 16, 1990

[51] Int. Cl.[5] ............................................. F16H 15/50
[52] U.S. Cl. ..................................... 475/185; 74/190
[58] Field of Search ................... 74/190, 198; 475/185, 475/186

[56] References Cited

U.S. PATENT DOCUMENTS

| | | | |
|---|---|---|---|
| 1,146,982 | 7/1915 | Weiss | 74/198 |
| 1,452,946 | 4/1923 | Weiss | 74/190 |
| 1,537,515 | 5/1925 | Weiss | 74/198 |
| 1,541,882 | 6/1925 | Weiss | 74/198 |
| 1,728,383 | 9/1929 | Weiss | 74/198 |
| 3,076,347 | 2/1963 | Grant | 74/190 |
| 4,044,620 | 8/1977 | F'Geppert | 475/185 X |
| 4,112,781 | 9/1978 | Baugh | 74/198 |
| 4,448,087 | 5/1984 | Barzel | 74/198 X |
| 4,487,086 | 12/1984 | Broziat | 74/198 |
| 4,841,791 | 6/1989 | Lopez | 74/190 |

FOREIGN PATENT DOCUMENTS

| | | | |
|---|---|---|---|
| 3110649 | 10/1982 | Fed. Rep. of Germany | 74/190 |
| 1082202 | 12/1954 | France | 74/190 |

OTHER PUBLICATIONS

SAE The Engineering Society for Advancing Mobility Land Sea Air and Space, "Continuously Variable Transmission for Passenger Cars", PT-30, pp. 195-208, 1986.
SAE Society of Automotive Engineers, Inc., "Advances in Traction Drive Technology", pp. 3.921-3.934, 1984.
NASA Reference Publication 1154, Published Oct. 1985, "Design of Traction Drives", by Stuart H. Lowenthal and Erwin V. Zaretsky, pp. 1-45.
"Rubber-Band", Cars are Coming Back, *Mechanical Engineering*, Dec. 1984 issue, pp. 34-38, an ME Staff Report.
"Of Continuous Interest", by John Matras, *Autoweek*, Jan. 23, 1989 issue, pp. 26-27.
"Subaru Revives the Variable Transmission", *Consumer Reports*, Aug., 1989 issue, pp. 500-501.

*Primary Examiner*—Allan D. Herrmann
*Attorney, Agent, or Firm*—Geoffrey A. Mantooth

[57] ABSTRACT

A continuously variable transmission has an input shaft rotatably mounted to a frame. Plural output wheels are located around the input shaft and are rotatably mounted to the frame. The output wheels have respective axes of rotation that lie in a plane, which plane is generally perpendicular to the axis of rotation of the input shaft. Each output wheel has an arcuate circumferential surface. The output wheels are arranged around the input shaft so that the innermost portions of their circumferential surfaces form a traversing path around the input shaft. The input shaft has one or more drive rollers coupled thereto so that the drive rollers can both rotate and pivot independently of the input shaft. As the print shaft rotates, the drive rollers traverse the traversing path. A slide assembly is mounted on the input shaft and is linked to the drive rollers so as to vary the orientation of the drive rollers relative to the traversing path, wherein the speed ratio between the input shaft and the output wheels can be controlled.

10 Claims, 5 Drawing Sheets

CONTINUOUSLY VARIABLE TRANSMISSION

FIELD OF THE INVENTION

The present invention relates to transmissions of the type that are used to regulate the transmission of power from an engine or motor to a load that is driven by the engine or motor, such as are used in automobiles.

BACKGROUND OF THE INVENTION

Automotive vehicles utilize transmissions to transmit power from the engine to the drive wheels or tires. The transmission provides an interface between the engine and the drive wheels such that the driver can vary the speed of the vehicle over a wide range.

Automotive vehicles at the present time utilize fixed ratio transmissions. These transmissions have a set of gears that provide a few fixed and discrete speed ratios between the input from the engine and the output to the tires. Engine rpm (revolutions per minute) varies over a wide range for each speed ratio. Because the engine must operate over a wide range of speeds, its overall efficiency is reduced.

Continuously variable transmissions offer a way to boost engine efficiency. Unlike fixed ratio transmissions, continuously variable transmissions offer a wide range of speed ratios between the input from the engine and the output to the tires. This allows the engine to operate over a narrow range of optimum rpm, wherein the engine can be increased. By varying the speed ratio, the engine rpm can be maintained in its optimum range, even for a variety of driving conditions, thereby improving fuel efficiency.

Prior art continuously variable transmissions utilize a belt to couple two sheaves together. One sheave is an input sheave while the other is an output sheave. The sheaves can vary their effective diameter, so as to control the speed ratio. The problem with belt driven transmissions is that the belts cannot handle the engine power produced by large engines.

SUMMARY OF THE INVENTION

It is an object of the present invention to provide a continuously variable transmission for a vehicle such that the vehicle engine can be operated within a narrow range of rpm's.

The transmission of the present invention comprises first rotational means for producing rotational motion, output means for coupling the rotational movement of said first rotational means to a load, second rotational means, input drive means and control means. The first rotational means is generally toroidally shaped so as to form an inner space at the center of said toroid. The first rotational means has an outside surface that extends all around the toroidal first rotational member and generally encloses an interior portion of said toroidal first rotational means. The outside surface has a circular cross-section and rotates about an arcuate axis of rotation that extends through the interior portion so as to surround the inner space. The outside surface has portions that are temporarily adjacent to the inner space during rotation of the outside surface, which outside surface portions have rotational tangents such that an application of force along the rotational tangents produces rotation of the outside surface. The outside surface portions rotate in the same direction. The output means is coupled to the first rotational means so as to rotatable thereby. The output means is adapted to be coupled to a load. The second rotational means is located inside the inner space of the first rotational means. The second rotational means rotates about an axis of rotation. The second rotational means axis of rotation is rotatable about a central axis extending through a center of the inner space such that the second rotational means contacts and traverses portions of the outside surface portions of the first rotational means. The central axis is perpendicular to a plane containing the arcuate axis of rotation of the first rotational means. The second rotational means axis of rotation is capable of changing orientation with respect to the arcuate axis of rotation. The input drive means rotates the second rotational means about the central axis such that as the second rotational means traverses portions of the outside surface portions the second rotational means rotates about its axis of rotation. The control means is for changing the orientation of the second rotational means axis of rotation with respect to the arcuate axis of rotation such that the amount of force produced by the traversing second rotational means along the rotational tangents of the outside surface portions can be varied, wherein when the second rotational means axis of rotation is perpendicular to the arcuate axis of rotation plane, the amount of force produced along the rotational tangents is minimal, and when the second rotational means axis of rotation moves away from being perpendicular to the arcuate axis of rotation plane, the amount of force along the rotational tangents increases.

In another aspect, the transmission includes an input shaft rotatably mounted to a frame. The input shaft is adapted to be rotated by motor means and is rotatable about its longitudinal axis. Plural output wheels are provided, with each of the output wheels having a circumferential surface. Each of the output wheels is rotatably mounted to the frame such that the input shaft is located adjacent to portions of each of the circumferential surfaces. The output wheels are located circumferentially about the input shaft such that a traversing path is formed around the input shaft. The traversing path is formed from the portions of the circumferential surfaces. Coupling means is provided to couple the output wheels together so that the output wheels rotate in unison. Drive wheel means for transferring rotary movement from said input shaft to said output wheels is provided. The drive wheel means has a circumferential drive surface. The drive wheel means is eccentrically coupled to the input shaft such that the drive surface contacts the traversing path formed by the output wheel circumferential surfaces. The drive wheel means is rotatable about an axis of rotation such that the drive wheel means rotates independently of the input shaft. The drive wheel means is coupled to the input shaft such that the axis of rotation of the drive wheel means rotates about the input shaft longitudinal axis. The drive wheel means is coupled to the input shaft such that the orientation of the drive wheel means axis of rotation can vary with respect to the input shaft longitudinal axis. Control means is provided for changing the orientation of the drive wheel means axis of rotation with respect to the input shaft longitudinal axis. The control means is coupled to the drive wheel means, wherein the amount of rotary movement transferred between the input shaft and the output wheels can be controlled with the control means by controlling the orientation of the drive wheel means axis of rotation with respect to the input shaft longitudinal axis.

The transmission of the present invention provides an infinite number of speed ratios between the input and the output. The toroidally shaped output wheel assembly rotates about a circular axis of rotation, while the drive wheel rotates about an axis that is generally perpendicular to a plane containing the circular axis of rotation, while traversing the interior of the output wheel assembly. By adjusting the orientation of the drive wheel with respect to the output wheels, the amount of force transmitted from the input to the output can be controlled. Thus, when the drive wheel lies wholly within the plane of the circular axis of rotation, no force is transmitted and the drive wheel merely traverses around the interior of the output wheel assembly. The output wheel assembly is thus not rotated by the drive wheel. However, when the drive wheel is tilted out of the plane of the circular axis of rotation, then some force is produced along rotational tangents of the output wheel assembly, causing the output wheels to rotate in unison. By increasing the amount of tilt, the amount of force transmitted to the output wheels is also increased, increasing the rotational speed. The orientation of the drive wheel is determined by the position of a slide assembly that is positioned along an input shaft. The input shaft rotates the drive wheel, causing it to traverse the interior of the output wheel assembly. The slide assembly slides along the longitudinal axis of the input shaft and is connected to the drive wheel by linkages. As the slide assembly moves along the input shaft longitudinal axis, the orientation of the drive wheel changes.

DESCRIPTION OF PREFERRED EMBODIMENTS

Figure 1:
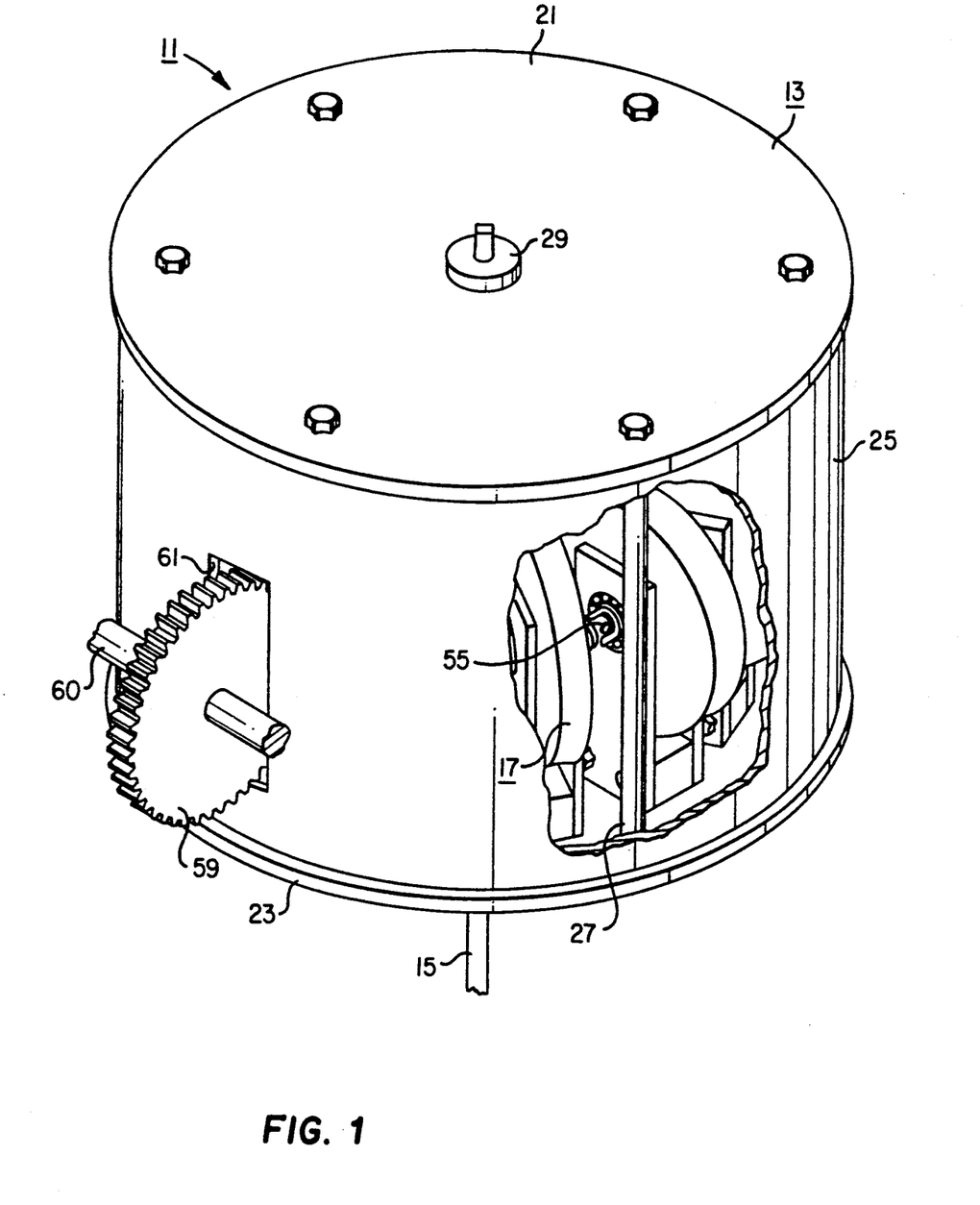
FIG. 1 is an isometric partially cut away view of the transmission of the present invention, in accordance with a preferred embodiment.

In FIG. 1, there is shown an isometric, partially cut away view of the transmission 11 of the present invention, in accordance with the preferred embodiment. The transmission 11 of the present invention can be used in vehicles to transmit power from the engine to the drive mechanism such as wheels. The transmission can also be used in motor assemblies such as are used in factory machinery and the like, wherein the transmission regulates the transmission of power from the motor or engine to the driven apparatus.

Figure 2:
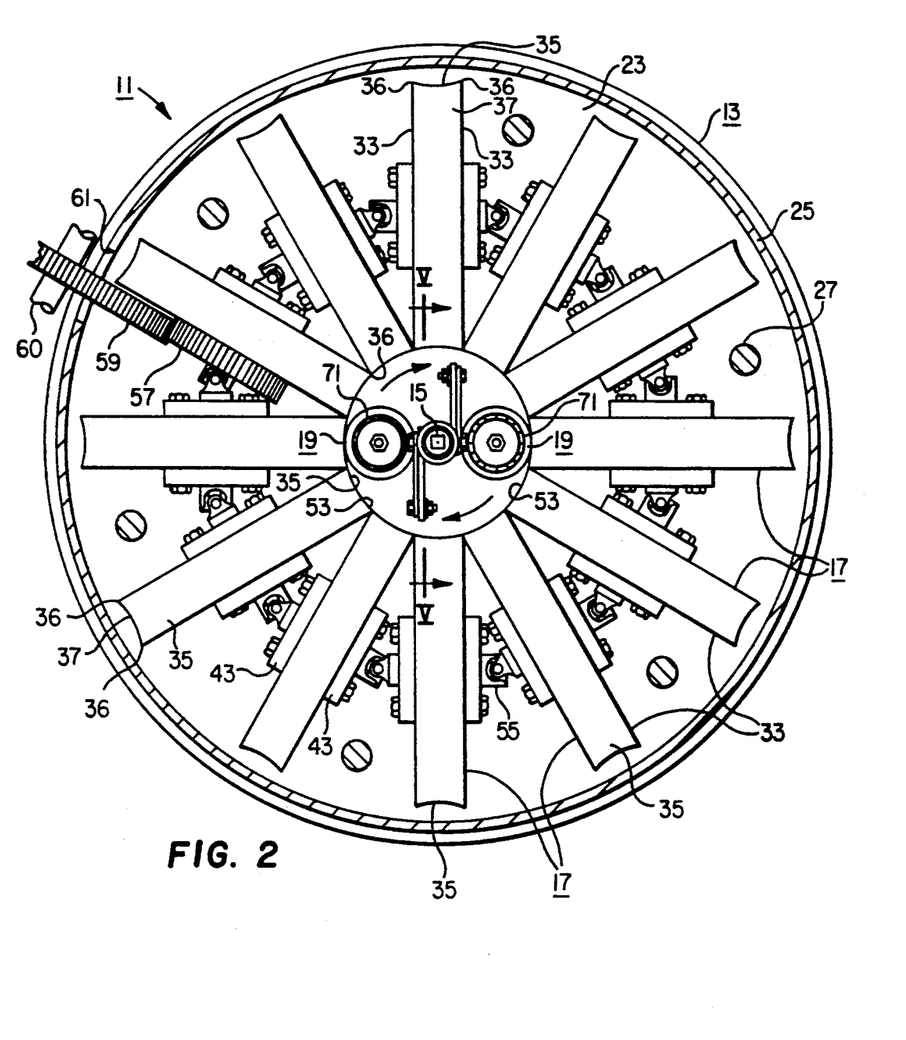
FIG. 2 is a top plan view of the transmission, shown with the housing cut away.
Figure 3:
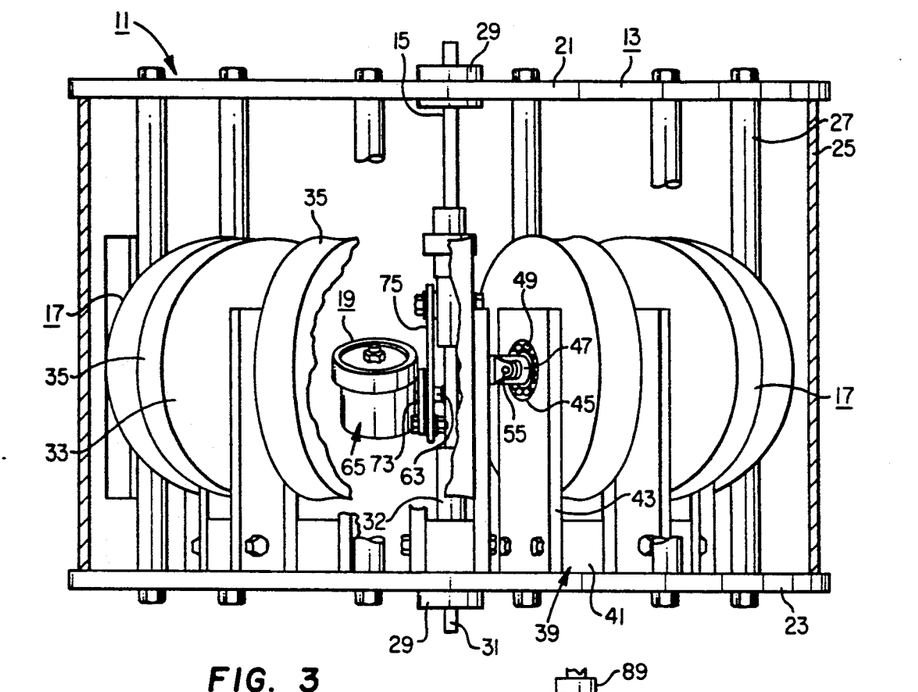
FIG. 3 is a side elevational view of the transmission, with a portion of the output wheels being cut away to show the input shaft and a drive roller assembly.

Referring to FIGS. 1—3, the transmission 11 of the present invention includes a housing 13, an input shaft 15, plural output wheels 17 and drive rollers 19.

The housing 13 includes upper and lower end walls 21, 23 and side walls 25 that extend between the upper and lower end walls. In this description, "upper" and "lower" are used with reference to the orientation of the transmission in the drawings. Support members 27 extend between the end walls 21, 23 to reinforce the end walls and rigidify the housing The housing 13 provides a rigid frame for supporting and enclosing the other components of the transmission 11. In the preferred embodiment, the housing 13 is cylindrical in shape, having circular end walls and a cylindrical side wall. However, the shape of the housing is irrelevant to the present invention.

The input shaft 15 extends between the end walls 21, 23 of the housing (see FIG. 3). Each of the end walls has a bearing 29 mounted thereon, which bearings receive the input shaft such that the shaft 15 can rotate relative to the housing 13. The shaft 15 rotates about its longitudinal axis. One end 31 of the shaft 15 extends away from the transmission where it couples to motor means, such as a fossil fuel engine or an electric motor (not shown). The motor means rotates the shaft 15. Stop means 32 are provided on both sides of one bearing 29 to prevent longitudinal movement of the input shaft 15 within the housing 13 (in the drawings, only one stop means 32 is shown).

Located about the input shaft 15 are a plurality of output wheels 17. Each output wheel 17 is disc shaped, although the shape of the output wheels could vary, depending on the number of output wheels used. Each output wheel 17 has smooth, flat side surfaces 33 and a smooth circumferential surface 35 extending 360 degrees around the wheel in a continuous manner. The circumferential surface 35 extends between two edges 36, which edges are formed by the intersection of the circumferential surface and the two side surfaces 33. The circumferential surface 35 is concave such that the diameter of the output wheel 17 is greater at the edges 36 than at the center 37 of the output wheel. The output wheels can be made from a variety of materials, including aluminum, composites and plastics such as thermoplastics.

The output wheels 17 are rotationally coupled to the housing 13. Each output wheel 17 has a mounting assembly 39 for rotatably mounting the respective output wheel to an end wall 23. Each mounting assembly 39 has an anchor block 41 that is coupled by suitable fasteners to one of the end walls 23. The anchor block 41 is generally rectangular and is oriented in a radial direction from the input shaft 15. Mounting plates 43 extend from the respective block 41 toward the other end wall 21. The mounting plates 43 are coupled to the anchor block 41 and form a fixed yoke for receiving an output wheel 17. Each mounting plate 43 has a circular opening 45 therethrough for receiving a shaft 47 and bearings 49. Each output wheel 17 is fixably coupled with its respective shaft 47 so as to turn in unison therewith. This mounting arrangement allows each output wheel 17 to rotate with respect to its mounting assembly 39.

The output wheels 17 are located in the housing so as to completely surround the input shaft 15. When viewing the transmission 11 in plan view, such as is shown in FIG. 2, the output wheels 17 extend radially outward from an area surrounding the input shaft 15. The output wheels 17 are oriented with respect to the input shaft 15 so that their shafts 47 all lie in a single plane, which plane is perpendicular to the longitudinal axis of the input shaft. The axis of rotation of each output wheel 17 is displaced from the input shaft 15 by a distance that is greater than the radius of the output wheel so as to leave a space between the circumferential surface 35 and the input shaft. This space receives the drive rollers 19.

The output wheels 17 are arranged as close as possible to the input shaft 15, while still allowing the output wheels to rotate. Thus, the output wheels 17 are arranged so that the innermost portions (that is, those portions that are closest to the input shaft 15) of the edges 36 are in a contacting or near contacting relationship with the adjacent edge 36 of the respective adjacent output wheel. This closed-in arrangement of the output wheels 17 forms a continuous or near continuous traversing path 53 around the input shaft 15. The traversing path 53 is formed from the innermost portions of the circumferential surfaces 35. The traversing path 53 is a 360 degree path that is followed by the drive rollers 19 as they traverse about the circle of output wheels 17. As the output wheels rotate about their respective axes of rotation, new portions of the respective circumferential surfaces 35 continuously enter and exit the traversing path 53. The portion of the circumferential surfaces 35 of the output wheels 17 that are within the traversing path 53 has rotational tangents 54 (see FIG. 5) that are parallel to the input shaft 15. If a force is applied to an output wheel 17 in a direction along the rotational tangent 54, then the output wheel will rotate. The circumferential surfaces 35 are shaped such that the traversing path 53 surrounding the input shaft 15 is circular. Thus, the degree of concaveness of the circumferential surfaces 35 depends on the diameter of the traversing path 53. For large diameter traversing paths 53, the circumferential surfaces 35 are flatter than the circumferential surfaces of smaller diameter traversing paths.

The output wheels 17 are all coupled together so as to rotate in unison with each other. The output wheels 17 are coupled together with U-joints 55, which are located at the ends of the shafts 47. U-joints 55 are used to couple the shafts 47 together, because the axes of rotation of adjacent output wheels are not colinear, but are instead angled with respect to each other.

One of the output wheels 17 has an output gear 57 coupled thereto (see FIG. 2). The output gear 57 rotates in unison with the output wheels 17. Thus, the rotary movement of the assembly of output wheels 17 can be tapped by providing a load gear 59 in meshed arrangement with the output gear 57. An opening 61 is provided in the side wall 25 of the housing 13 to allow a portion of the load gear 59 to come in contact with the output gear 57. The load gear 59 is coupled to and drives a load shaft 60, upon which is provided the load (not shown) that is to be driven.

The drive rollers or wheels 19 are coupled to the input shaft 15 such that the rollers can both rotate and pivot independently of the input shaft. The input shaft 15 has two short support rods 63 that project outwardly from the input shaft. The support rods 63 are perpendicular to the input shaft 15 and are located 180 degrees apart from each other. The drive rollers 19 are mounted to the support rods by respective mounting assemblies 65. Each mounting assembly 65 has a block 67 with a channel 69 therein for receiving one of the support rods 63. Each drive roller 19 is coupled to the respective mounting block 67 by way of a bearing 71. The bearing 71 is coupled to the respective mounting block 67 by suitable fastening means. Each drive roller 19 rotates with respect to the respective mounting block 67 about an axis of rotation that is offset from the input shaft longitudinal axis. When the mounting block 67 is assembled onto the respective support rod 63, the drive roller 19 and the mounting block 67 can slide along the respective support rod.

Figure 5:
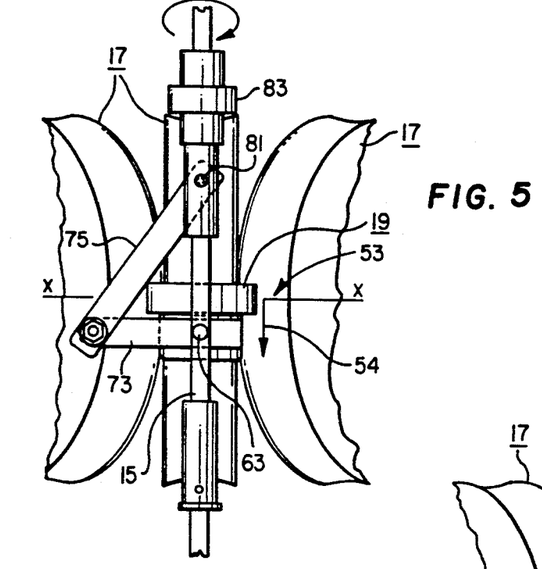
FIG. 5 is a view showing one of the drive rollers oriented so as to lie in the plane X—X of the traversing path, taken through lines V—V of FIG. 2.

Each mounting assembly 65 also has a bar 73 extending out from the mounting block 67 in a generally perpendicular direction to the axis of rotation of the drive roller 19 (see also FIG. 5). The free end of the bar 73 is pivotally coupled to one end of a linkage bar 75. The other end of the linkage bar 75 is pivotally coupled to a control or slide assembly 77. The slide assembly 77 is located on the input shaft 15 and is capable of sliding back and forth thereon. Because the slide assembly 77 is connected to the drive rollers 19 by a two-bar linkage, the drive rollers 19 can be made to pivot about the support rod 63 by sliding the slide assembly 77 along the input shaft. This causes the axes of rotation of the drive rollers 19 to change orientation with respect to the input shaft 15. The drive rollers 19 are linked to the slide assembly 77 such that they change orientation in opposite directions, relative to one another. Thus, referring to the orientation shown in FIG. 5, as the slide assembly 77 is moved down toward the support rods 63, the axis of rotation of the drive roller that is shown in FIG. 5 rotates in the counterclockwise direction, while the axis of rotation of the drive roller that is not shown in FIG. 5 rotates in the clockwise direction.

The slide assembly 77 has a channel 79 that slidingly receives the input shaft 15. The slide assembly 77 rotates in unison with the input shaft 15. This can be achieved by using an input shaft 15 with a rectangular or square transverse cross-section and a channel 79 of similar cross-section. The slide assembly 77 has two diametrically opposed pins 81 projecting outwardly therefrom. The pins 81 are used as securing points for the linkage bar 75 to pivotally couple to. The slide assembly has a bearing 83 mounted thereon. The bearing 83 allows a control rod (not shown) or bar to be coupled to the slide assembly 77 so that the control rod will not rotate with the input shaft. As the slide assembly 77 rotates with the input shaft 15, the bearing 83 allows the control rod to actuate the slide assembly 77 longitudinally along the input shaft, while the input shaft is rotating.

When the input shaft 15 is mounted inside of the housing 13, the drive rollers 19 are located inside of the output wheels 17 such that the eccentrically mounted drive rollers are in the plane X—X (see FIG. 5) containing the traversing path 53 such that the drive rollers can contact the traversing path formed by the output wheels. Thus, as the input shaft rotates, portions of the drive rollers will contact portions of the traversing path formed by the output wheels.

Figure 6:
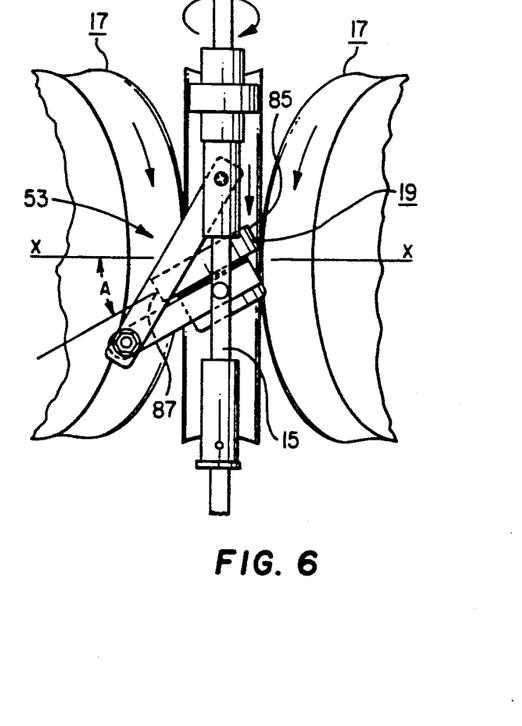
FIG. 6 is similar to FIG. 5, but showing the drive roller oriented at a positive angle relative to the traversing path plane X—X.

The operation of the transmission 11 will now be described, with reference to FIGS. 5-7. The rotational power of the input shaft 15 is transmitted to the output wheels 17 by way of the drive rollers 19. The amount of rotational power transmitted to the output wheels 17 is determined by the orientation of the drive rollers 19 relative to the plane containing the traversing path 53. The orientation of the drive rollers 19 is determined by the position of the slide assembly 77 along the input shaft 15.

As the input shaft 15 rotates, the drive rollers 19 are thrown outwardly along the support rods 63 by centrifugal force. This causes the drive rollers 19 to bear on the traversing path 53. The rotation of the input shaft 15 causes the axes of rotation of the drive rollers 19 to also rotate about the longitudinal axis of the input shaft. The drive rollers 19, which are free to rotate about their own axes of rotation independently of the input shaft 15, traverse the traversing path much like an automobile tire traverses a road surface. Thus, as each drive roller 19 traverses the traversing path 53, it rotates about its respective axis of rotation.

The drive roller is made of a stiff yet resilient material such as polycarbon or synthetic rubber to assist in traction between the drive roller and the output wheels so as to prevent slippage therebetween. Ideally, there should be no slippage between the drive rollers 19 and the output wheels 17. Slippage is also reduced by increasing the centrifugal force acting on the drive rollers 19, which force causes the drive rollers to bear with more force, along the axis of the support rods 63, on the output wheels 17. The centrifugal force is increased by the provision of weights to the mounting assembly 65 and by the use of a fairly high input shaft rotational speed (for example 2000-3000 rpm). The resilient material of each drive roller also increases the area of contact between the drive roller and the output wheels.

With the drive rollers 19 oriented so as to be parallel to the plane X—X of the traversing path 53, as shown in FIG. 5, the output wheels 17 remain stationary and do not rotate, while the drive rollers traverse the traversing path. This is because the respective drive rollers 19 impart no force along a rotational tangent of the circumferential surfaces 35 of the output wheels 17. This orientation of the drive rollers 19 corresponds to an idle mode because no power is transmitted from the input shaft to the output wheels. Instead, the drive rollers 19 merely traverse the traversing path 53 in the plane X—X.

The orientation of the drive rollers 19 can be changed by moving the slide assembly 77 along the input shaft 15. Moving the slide assembly 77 towards the support rod 63 causes the drive rollers 19 to pivot such that the respective leading portion 85 is raised out of the plane X—X of the traversing path 53 while the trailing portion 87 is lowered out of the traversing path plane (with reference to the orientation of FIG. 6).

With the drive rollers 19 tilted relative to the traversing path plane X—X, such that the axes of rotation are no longer perpendicular to the plane X—X, the drive rollers now produce a force along the rotational tangents 54 of the circumferential surfaces 35 of the output wheels 17. This causes the output wheels 17 to rotate. Each tilted drive roller 19 produces a reaction force against the output wheels 17 at the area of contact between the drive roller and output wheels. The reaction force is perpendicular to the axis of rotation of the drive roller 19. The reaction force can be resolved into a component lying in the plane X—X and a component along the rotational tangent 54 of the respective output wheel. The reaction force along the component lying in the plane X—X is negligible because the drive roller is free to rotate about its axis of rotation. The reaction force along the rotational tangent of an output wheel produces rotation of that output wheel. For the orientation shown in FIG. 6, where the drive roller 19 traverses from left to right along the output wheel traversing path 53, the innermost portions of the output wheels move downwardly as shown. All of the output wheels 17 rotate in unison with one another. Thus, the entire output wheel assembly rotates, including the output gear 57 which in turn rotates the low gear 59 and the load shaft 60.

The transmission 11 of the present invention provides an infinite number of speed ratios between the input shaft and the output wheels, hence the designation "continuously variable". The speed ratio is determined by the orientation of the drive rollers 19 relative to the plane X—X of the traversing path 53. As the orientation of the drive rollers 19 deviates more and more from the idle orientation shown in FIG. 5, such that the drive rollers become more and more tilted out of the traversing path plane X—X (and the axes of rotation of the drive rollers become less perpendicular to the plane X—X), the faster the output wheels rotate for a fixed input shaft speed. This is because the reaction force component along the rotational tangent 54, which reaction force is produced by the drive rollers against the output wheels, becomes larger. Thus, the output speed of the load shaft 60 can be controlled by controlling the position of the slide assembly 77 along the input shaft 15. As the slide assembly 77 is moved in either direction out of the idle position, the drive rollers 19 begin to rotate the output wheels 17. As the slide assembly moves further away from its idle position on the input shaft 15, the speed of the output wheels will increase while allowing the input shaft to rotate at a constant speed.

The speed ratio is also determined by the size of the output wheels and by the distance between the output wheels and the input shaft. In fact, Speed Ratio = (Rd/Ro) tan A where Rd is the radius of the traversing path 53 (or the distance from the input shaft to the output wheel circumferential surfaces 35), Ro is the radius of the output wheels and A is the angle of the drive roller 19 with the plane X—X (see FIG. 6). Thus, when A=45 degrees and Rd=Ro, the speed ratio is 1.

Directional changes in the rotation of the output wheels 17 and the load shaft 60 are also controlled by the position of the slide assembly 77 on the input shaft 15. The output wheels 17 can be made to reverse their direction of rotation by moving the slide assembly 77 out of the idle position shown in FIG. 5 and away from the support rods 63 (see FIG. 7).

Moving the slide assembly 77 away from the support rods 63 causes the drive rollers 19 to pivot such that the respective leading portion 85 is below the traversing path 53 plane X—X while the trailing portion 87 is above the traversing path plane (with reference to the orientation of FIG. 7). The drive rollers 19 operate as described above, but because their orientation is changed, the innermost portions of the output wheels 17 are rotated upwardly. As described above, the speed ratio is controlled by adjusting the position of the slide assembly relative to the idle position.

The direction of rotation of the output wheels 17 is dependent not only on the orientation of the drive rollers 19 relative to the traversing path plane X—X but also on the direction of rotation of the input shaft. In the description above, the input shaft 15 is rotated such that the drive roller 19 shown in FIGS. 6 and 7 moves from left to right. If the direction of the input shaft is reversed, such that the drive roller moves from right to left, then the rotational direction of the output wheels would also be reversed for the respective orientations of the drive rollers.

Figure 4:
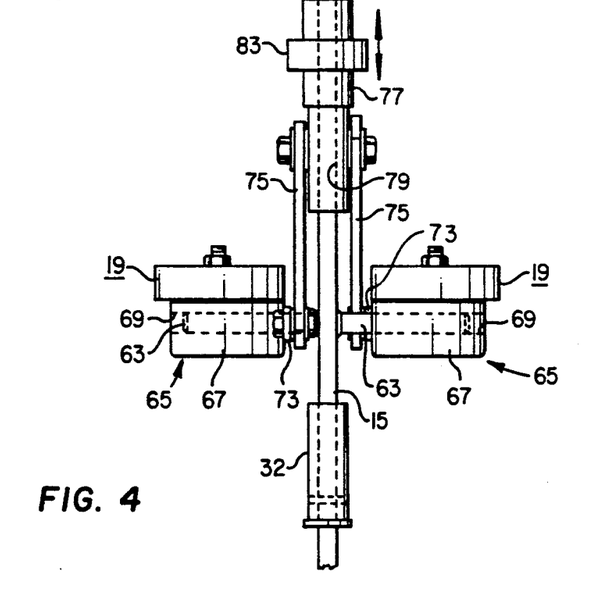
FIG. 4 is a side view of the input shaft and the drive rollers.

In some applications, it may be desirable to limit the rotation of the output wheel to just one direction. One way to do so is to provide a stop 89 on the input shaft 15, as shown in FIG. 4. The stop 89 prevents the sleeve assembly 77 from moving out of the idle position away from the support rods 63. The sleeve assembly is limited to only one direction of movement from the idle position. In addition, the stop 89 serves as a reference point for locating the idle position on the input shaft. Thus, when the sleeve assembly is being moved into the idle position, it need only be brought into contact with the stop 77, wherein the idle position will be achieved.

Figures 8, 9:
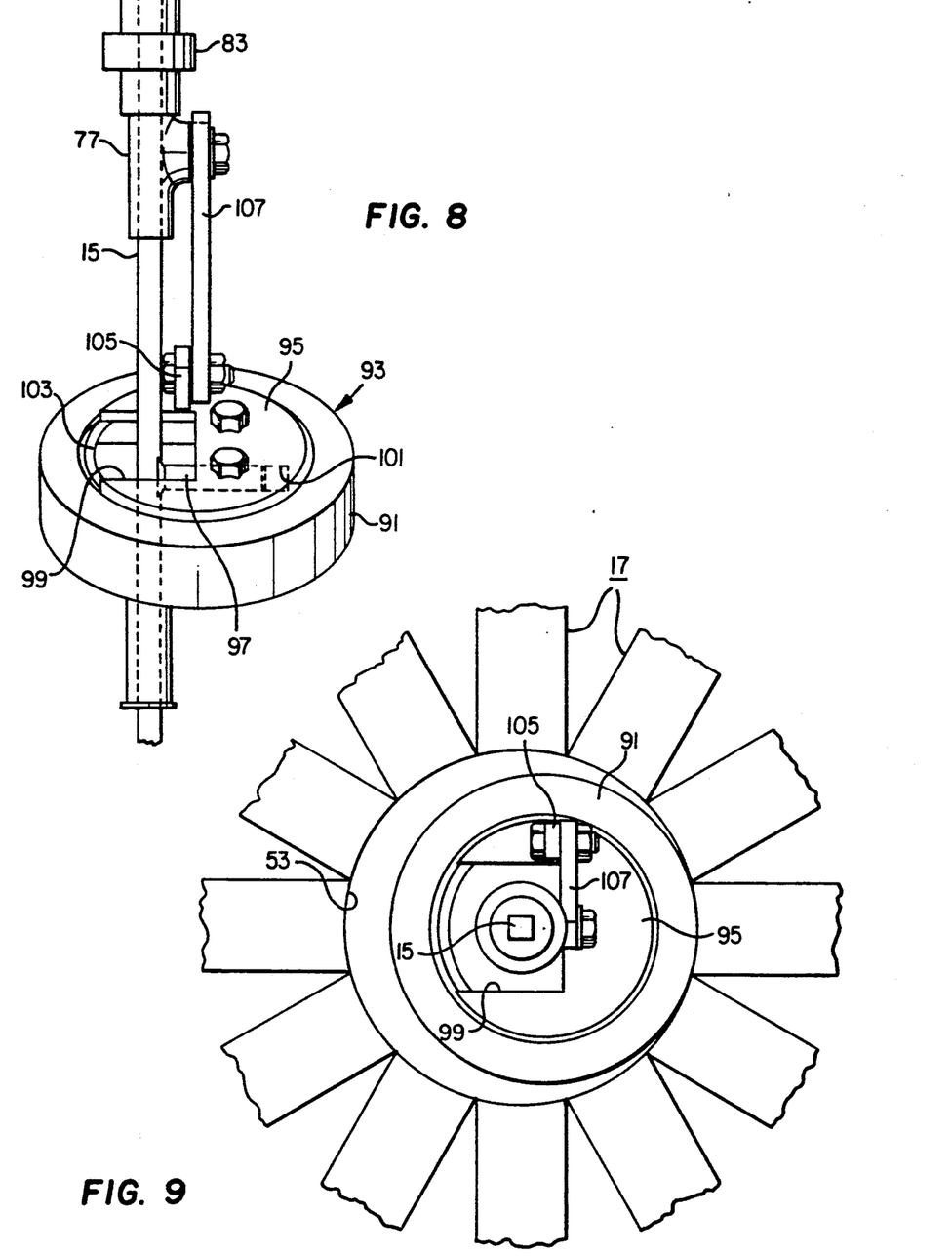
FIG. 8 is a side view of the input shaft and drive roller, in accordance with another embodiment.
FIG. 9 is a top plan view of the transmission with the drive roller of FIG. 8.

As an alternative to plural drive rollers 19, a single large drive roller 91 can be used instead (see FIGS. 8 and 9). The drive roller 19 is part of a drive roller assembly 93, which assembly includes a mounting portion 95. The mounting portion 95 couples the drive roller 19 to the input shaft 15. The input shaft 15 has a single support rod 97 that is coupled thereto and that projects perpendicularly from the input shaft for a short distance. The mounting portion 95 is a block with a generally rectangular opening 99 therethrough for receiving the input shaft 15. The mounting portion 95 also has a channel 101 for receiving the support rod 97. With the mounting portion 95 assembled onto the support rod 97, the drive roller 91 can pivot about the support rod. Furthermore, the mounting portion 95 can slide along the support rod 97. The drive roller 91 is rotatively coupled to the mounting portion 95 by way of a bearing 103. The inner portion of the bearing 103 is secured to the mounting portion block 95. The drive roller 91 is made of a durable resilient material, such as synthetic rubber, in order to provide suitable traction on the circumferential surfaces of the output wheels.

The mounting portion 95 has a short projection 105 extending up. A linkage bar 107 is pivotally coupled at one of its ends to the projection 105. The other end of the linkage bar 107 is pivotally coupled to the slide assembly 77 on the input shaft 15. The linkage arrangement enables the slide assembly 77 to move along the input shaft to adjust the orientation of the drive roller 91. As the slide assembly 77 moves along the input shaft 15, the drive roller 91 pivots about the support rod 97.

The drive roller 91 is eccentrically mounted to the input shaft 15 as shown in FIG. 9. The input shaft 15 is located in the center of the traversing path 53 defined by the output wheels 17. The eccentrically mounted drive roller 91 contacts a portion of the traversing path 53.

The operation of the transmission with the single drive roller 91 is as described above with reference to the plural drive rollers 19. Movement of the slide assembly 77 along the input shaft 15 controls the orientation of the drive roller 19. The transmission is in the idle mode when the axis of rotation of the drive roller is perpendicular to the traversing path plane X—X. When the drive roller is tilted out of the traversing path plane, so that the axis of rotation is no longer perpendicular to the plane, then the drive roller imparts rotary motion to the output wheels.

Use of the larger drive roller 91 shown in FIGS. 8 and 9 increases the "footprint" or area of contact between the drive roller and the output wheels. By increasing the footprint, the pressure between the drive roller and the output wheels is distributed over a larger area. This reduces the stress on the surfaces of the drive roller and output wheels, thereby increasing the lifetimes of those surfaces. In addition, the larger footprint enables the reduction of slippage between the drive roller and the output wheels. Use of a large diameter drive roller 91 also reduces the rpm of the drive roller, which increases the life of the drive roller.

The footprint of the drive roller on the output wheels can be increased by increasing the diameter of the output wheels. This has the effect of flattening out the output wheels at the circumferential surfaces, thereby exposing more circumferential surface to the drive roller. In addition, the drive roller can be made of a more resilient material to contact more surface area of the output wheels.

Although the transmission 11 of the present invention has been illustrated with twelve output wheels 17, the number of output wheels need not be limited to twelve. A smaller or larger number of output wheels can be used. With a smaller number of output wheels 17, the relative size of the circumferential surface 35 for each output wheel will increase. For example, with twelve output wheels, each circumferential surface inscribes an arc of 30 degrees. With four output wheels, each circumferential surface would inscribe an arc of 90 degrees. With a larger number of output wheels, the circumferential surfaces would become smaller.

The use of a large number of output wheels would present more of a problem in mounting the wheels to a frame work and rotatively coupling the wheels together. The use of a smaller number of output wheels would more likely produce a fluctuation in the speed ratio across the enlarged circumferential surfaces 35. Therefore, a trade off between the number of output wheels, such as twelve, is believed to be satisfactory.

The use of output wheels as described above produces an approximation of a toroidal rotatable member having a single outside surface. The toroidal outside surface is approximated by using the circumferential surfaces of the discrete output wheels, which wheels are coupled together. By applying force along the rotational tangents at the innermost portions of the toroidal output wheel assembly, the entire assembly rotates.

Although the transmission 11 of the present invention has been described with U-joints 55 for coupling the output wheels 17 together, other coupling means could be used. For example, beveled gears on the sides of the output wheels could mesh with adjacent beveled gears to rotatably couple the output wheels together.

Figure 7:
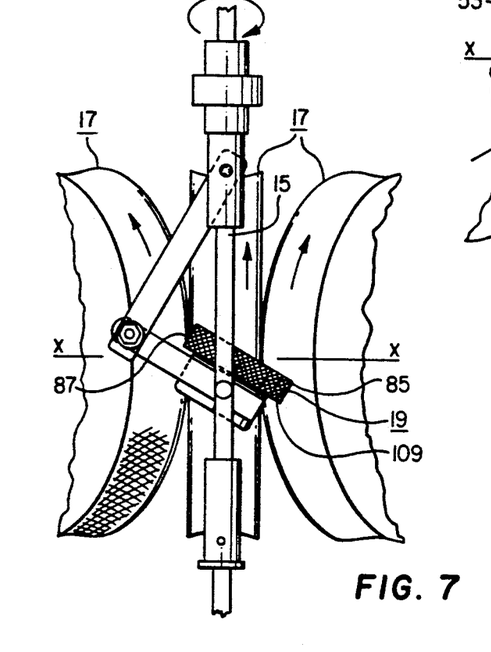
FIG. 7 is similar to FIG. 5, but showing the drive roller oriented at a negative angle relative to the traversing path plane X—X.

To further increase the traction between the drive roller and the output wheels, the outer surface 109 of the drive roller and the circumferential surface 35 of the output wheels can be textured (see FIG. 7). Such texturing would reduce the slippage between the outer surface and the circumferential surface when the drive roller is tilted relative to the plane X—X. Such texturing could take the form of providing grooves or dimples in the surfaces.

The foregoing disclosure and the showings made in the drawings are merely illustrative of the principles of the invention and are not to be interpreted in a limiting sense.

I claim:

1. A transmission, comprising:
   a) first rotational means for producing rotational motion, said first rotational means being made up of plural elements that form a generally torodial shape so as to form an inner space at the center of said toroid, each of said plural elements having an outside surface, each of said outside surfaces having a circular cross-section and rotating about an axis of rotation, said outside surfaces having respective portions that are temporarily adjacent to said inner space during rotation of said outside surfaces, which outside surface portions have rotational tangents such that an application of force along said rotational tangents produces rotation of said outside surfaces, said outside surface portions rotating in the same direction;

b) output means for coupling the rotational movement of said first rotational means to a load, said output means being coupled to said first rotational means so as to be rotatable thereby, said output means being adapted to be coupled to a load;

c) second rotational means located inside of said inner space, said second rotational means rotating about an axis of rotation, said second rotational means axis of rotation being rotatable about a central axis extending through a center of said inner space such that said second rotational means contacts and traverses portions of said outside surface portions of said first rotational means, said central axis being perpendicular to a plane containing said element axes of rotation of said first rotational means, said second rotational means axis of rotation being capable of changing orientation with respect to said plane;

d) input drive means for rotating said second rotational means about said central axis such that as said second rotational means traverses portions of said outside surface portions said second rotational means rotates about its axis of rotation;

e) control means for changing the orientation of said second rotational means axis of rotation with respect to said plane such that an amount of rotation produced by said second rotational means traversing along said rotational tangents of said outside surface portions can be varied, wherein when said second rotational means axis of rotation is perpendicular to said plane, the amount of force produced along said rotational tangents is minimal, and when said second rotational means axis of rotation moves away from being perpendicular to said plane, the amount of force along said rotational tangents increases.

2. A transmission, comprising:

a) an input shaft rotatably mounted to a frame, said input shaft being adapted to be rotated by motor means, said input shaft rotatable about its longitudinal axis;

b) plural output wheels, each of said output wheels having a circumferential surface, each of said output wheels being rotatably mounted to said frame such that said input shaft is located adjacent to portions of each of said circumferential surfaces, said output wheels being located circumferentially about said input shaft such that a traversing path is formed around said input shaft, said traversing path being formed from said portions of said circumferential surfaces;

c) coupling means for coupling said output wheels together so that said output wheels rotate in unison;

d) drive wheel means for transferring rotary movement from said input shaft to said output wheels, said drive wheel means having a circumferential drive surface, said drive wheel means being eccentrically coupled to said input shaft such that said drive surface contacts said traversing path formed by said output wheel circumferential surfaces, said drive wheel means being rotatable about an axis of rotation such that said drive wheel means rotates independently of said input shaft, said drive wheel means being coupled to said input shaft such that said axis of rotation of said drive wheel means rotates about said input shaft longitudinal axis, said drive wheel means being coupled to said input shaft such that the orientation of said drive wheel means axis of rotation can vary with respect to said input shaft longitudinal axis;

e) control means for changing the orientation of said drive wheel means axis of rotation with respect to said input shaft longitudinal axis, said control means being coupled to said drive wheel means, wherein the amount of rotary movement transferred between said input shaft and said output wheels can be controlled with said control means by controlling the orientation of said drive wheel means axis of rotation with respect to said input shaft longitudinal axis.

3. The transmission of claim 2 wherein each of said circumferential surfaces of said output wheels is concave in shape so as to form a circular traversing path around said input shaft.

4. The transmission of claim 3 wherein said control means comprises a slide assembly and linkage means, said slide assembly being slidably coupled to said input shaft so as to slide longitudinally along said input shaft, said slide assembly rotating with said input shaft, said linkage means coupling said slide assembly to said drive wheel means such that when said slide assembly slides along said input shaft, said linkage means changes the orientation of said drive wheel means axis of rotation.

5. The transmission of claim 2 wherein said control means comprises a slide assembly and linkage means, said slide assembly being slidably coupled to said input shaft so as to slide longitudinally along said input shaft, said slide assembly rotating with said input shaft, said linkage means coupling said slide assembly to said drive wheel means such that when said slide assembly slides along said input shaft, said linkage means changes the orientation of said drive wheel means axis of rotation 6. The transmission of claim 2 wherein said drive wheel means is mounted onto support rod means which support rod means is coupled to said input shaft, said drive wheel means being pivotable about said support rod means such that the axis of rotation of said drive wheel means can vary with respect to the input shaft longitudinal axis, said drive wheel means being slidable along said support rod means such that when said input shaft is rotated, centrifugal force forces said drive surface to bear on said traversing path.

7. A transmission, comprising:

a) an input shaft rotatably mounted to a frame, said input shaft being adapted to be rotated by motor means, said input shaft being rotatable about its longitudinal axis;

b) plural output wheels, each of said output wheels having a circumferential surface that extends around a circumference of said respective output wheel, each of said output wheels having edges, each of said circumferential surfaces having a width that extends between said edges of said respective output wheel;

c) each of said output wheels being rotatably mounted to said frame so as to rotate about a respective axis of rotation, said axes of rotation of said output wheels lying in a plane that is perpendicular to said input shaft longitudinal axis, said output wheels being located around said input shaft such that said edges of adjacent output wheels are close to each other and such that a traversing path is formed around said input shaft, said traversing path being formed from potions of said circumferential surfaces;

d) coupling means for coupling said output wheels together so that said output wheels rotate in unison;

e) output means for coupling the rotational movement of said output wheels to a load, said output means coupled to one of said output wheels so as to be rotatable by said one output wheel, and said output means being adapted to be coupled to a load;

f) drive wheel means for transferring rotary movement from said input shaft to said output wheels, said drive wheel means having a circumferential drive surface, said drive wheel means being eccentrically coupled to said input shaft such that said drive surface contacts said traversing path formed by said output wheel circumferential surfaces, said drive wheel means being rotatable about an axis of rotation such that said drive wheel means rotates independently of said input shaft, said drive wheel means being coupled to said input shaft such that said axis of rotation of said drive wheel means rotates about said input shaft longitudinal axis, said drive wheel means being coupled to said input shaft such that the orientation of said drive wheel means axis of rotation can vary with respect to said input shaft longitudinal axis;

g) control means for changing the orientation of said drive wheel means axis of rotation with respect to said input shaft longitudinal axis, said control means being coupled to said drive wheel means, wherein the amount of rotary movement transferred between said input shaft and said output wheels can be controlled with said control means by controlling the orientation of said drive wheel means axis of rotation with respect to said input shaft longitudinal axis.

8. The transmission of claim 7 wherein said control means comprises a slide assembly and linkage means, said slide assembly being slidably coupled to said input shaft so as to slide longitudinally along said input shaft, said slide assembly rotating with said input shaft, said linkage means coupling said slide assembly to said drive wheel means such that when said slide assembly slides along said input shaft, said linkage means changes the orientation of said drive wheel means axis of rotation.

9. The transmission of claim 8 wherein said slide assembly further comprises bearing means for allowing the coupling of a control rod to said slide assembly such that said control rod does not rotate with said slide assembly, said bearing means being coupled to said slide assembly.

10. The transmission of claim 7 wherein said output wheels are disc shaped and are arranged so as to extend radially from said input shaft.

* * * * *